UNITED STATES PATENT OFFICE.

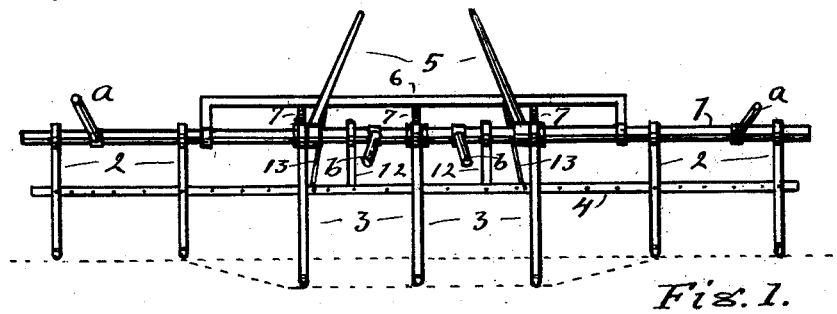
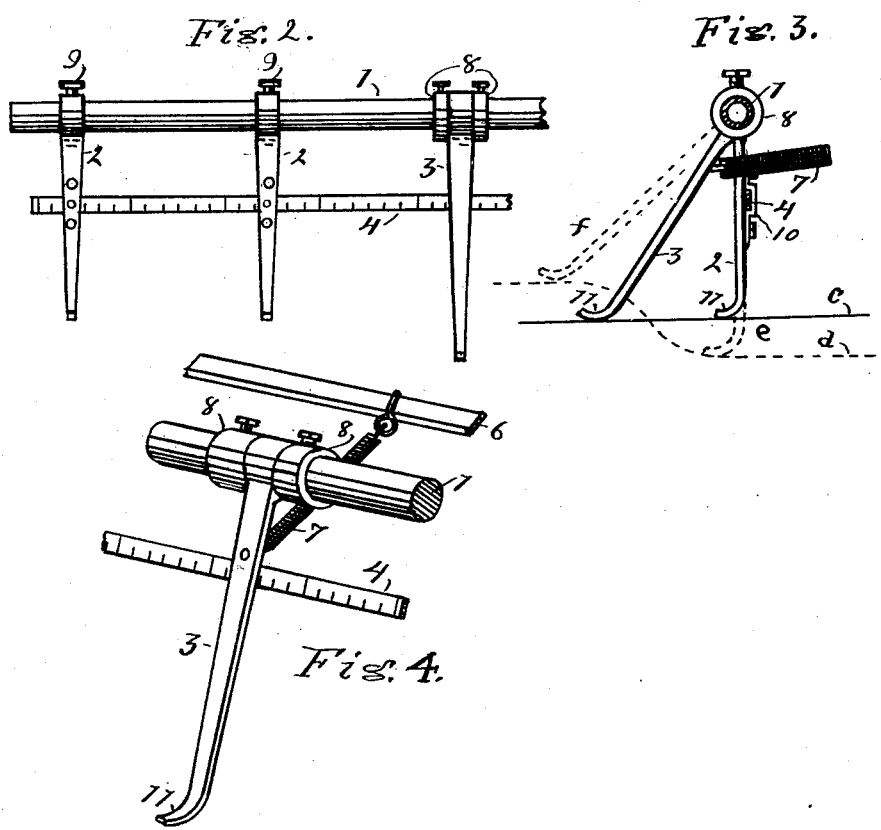

WILLIAM H. SIMMONS AND FLOYD G. SIMMONS, OF CEDAR SPRINGS, MICHIGAN.

LAND-MARKER.

1,113,378.  Specification of Letters Patent.  Patented Oct. 13, 1914.

Application filed April 25, 1914.  Serial No. 834,499.

*To all whom it may concern:*

Be it known that we, WILLIAM H. SIMMONS and FLOYD G. SIMMONS, citizens of the United States, residing at Cedar Springs, in the county of Kent and State of Michigan, have invented certain new and useful Improvements in Land-Markers, of which the following is a specification.

Our invention relates to improvements in land markers for use in marking off lines and squares for planting various kinds of seed crops, as potatoes, corn, &c., and its object is to provide a land marker with which the teeth or markers will adjust themselves to mounds and hollows on ground having an uneven surface.

We attain this object by the arrangement of parts shown in the accompanying drawing, in which—

Figure 1 is a rear view of the marker with the thills somewhat shortened. Fig. 2 is a like view of one end of the marker showing how the several teeth or markers are secured to the supporting shaft. Fig. 3 is a sectional end view of the marker looking to the left from the broken end of the shaft in Fig. 2 showing the relative positions of the teeth or markers on level, and on uneven ground. Fig. 4 is a perspective of a piece of the supporting shaft with one of the adjustable teeth mounted thereon and showing how the actuating spring is attached to the tooth and to the marker frame.

Similar letters and numerals refer to similar parts throughout the several views.

In its general construction this marker is very similar to land markers now on the market, having a supporting shaft 1, preferably of heavy gas pipe to insure as light a construction as possible. This shaft is provided with a series of handles, $a$ and $b$, so arranged that the marker may be handled and guided either at the center, as at $b$, or at either end, as at $a$ $a$. The teeth 2 2 are securely attached to the shaft 1 by means of set screws, 9 9, or by any other suitable device with which they may be released for the purpose of sliding them longitudinally on the shaft 1 for the purpose of varying the width of rows to be marked. These teeth have a girt or brace 4 securely bolted to them, and also braced to the shaft 1 by means of the short depending arms 12, and to the cross bar 6 by means of the rods 13 13 so that said girt will be held firmly in place against the resistance of the teeth as they are dragged along over the surface of the ground.

In Fig. 3 $c$ represents a normally level field, and the dotted lines $d$ represent the outline of an uneven surface. To meet and provide for the proper marking of the surface of a field having the surface broken by mounds and hollows, as indicated by the lines $c$ and $d$, we place several of the center teeth of the marker on the shaft in such a manner that they will readily slide around the shaft, as indicated by the dotted lines in Fig. 3, and secure them from longitudinal movement on the shaft by means of a collar 8 on each side of each of these loosely mounted teeth. These teeth are made somewhat longer than the teeth at and near the ends of the marker, so they may drop down into a declivity considerably below the normal surface of the ground, as indicated by the dotted lines $e$ in Fig. 3. This excess of length of the teeth 3, over the teeth 2 will cause the teeth 3 to be carried considerably back of the teeth 2 when marking on level ground, as indicated by the solid outlines of these teeth in Fig. 3, and if a mound is encountered the teeth 3 will be carried still higher, as indicated by the dotted lines $f$ in said figure.

We provide for normally holding the ends of the fingers 3 upon the surface of the ground with sufficient force or weight to positively insure a perfect marking of the ground, by means of suitable springs, as 7, secured at one end to the teeth, and at the other end to the cross bar 6 of the marker, as shown in Fig. 4 and plainly indicated in Fig. 1; the cross bar 6 is firmly secured to the lower surfaces of the thills 5, for the purpose, first, of properly bracing the thills, and, second, of providing the proper resistance against the tensile action of the springs 7.

The teeth 3 3 are not in any way secured to, or connected with the girt 4, but when in vertical position to reach down into, and mark the bottom of a declivity they will rest against this girt so the springs 7 cannot draw them forward beyond this line if they should happen to enter a declivity that was too deep for them to reach the bottom. The girt 4 is secured to the teeth 2 2 by means of brackets 10 in such a manner that they may be bolted so solid as to hold the teeth firmly in place, or they may be so loosened up as to render it an easy matter to slide the teeth longitudinally of the said girt when the bolts 9 9 are properly loosened from the shaft 1.

In the construction of the teeth for this marker we curve the ends of the teeth backward, as at 11, for the double purpose, first, of rendering their friction on the ground as they are being drawn along, as little as possible, and, second, to avert the danger of the teeth being caught upon roots, stones, sod, &c. and thus endangering the breaking of the teeth, and a further object of curving the points of the teeth backward is to insure perfectly smooth markings. With the teeth curved forward, or even straight, the dragging of the teeth over the surface of the ground will cause a trembling of the teeth and correspondingly rough markings, while with the teeth curved backward their action upon the ground is smooth and even and the markings are much plainer, much more easily distinguished, and much less likely to be filled up with falling soil from the trembling teeth. It also averts the danger of the teeth plowing deeply into the soil when they approach an acute knoll or mound, as would be the case if the marker indicated in Fig. 3 were moving to the left instead of to the right, as both the teeth 2 and 3 would be made to plow deeply into the bank or knoll there shown by the dotted lines $d$ below the dotted lines $f$, as plainly indicated by the point 11 of the arm 3 as shown in the solid lines in said figure. In Figs. 3 and 4 we have shown the girt 4 graduated in feet and inches to facilitate the setting of the several teeth as desired.

What we claim as new, and desire to secure by Letters Patent of the United States, is:—

1. In a land marker, a supporting shaft, a series of marking teeth securely mounted on said shaft, a series of teeth revolubly mounted on said shaft, and springs for holding said revoluble teeth in normal position.

2. In a land marker, a supporting shaft, a series of teeth securely mounted on said shaft, a series of teeth adjustably mounted on said shaft, a supporting girt secured to the permanent teeth, and springs secured to the adjustable teeth and to the marker frame for holding the teeth in normal position.

3. In a land marker, a supporting shaft, a series of marking teeth securely attached to the shaft, a supporting girt securely attached to said permanent teeth, a series of teeth adjustably mounted on the shaft and made longer than the permanent teeth, and springs for drawing said adjustable teeth toward the work.

4. In a land marker, a supporting shaft, thills and handles mounted on said shaft, a cross bar mounted on the thills, a series of teeth permanently mounted near each end of the shaft, a series of longer adjustable teeth mounted on the shaft between the two series of permanent teeth, and springs for holding said adjustable teeth to the work.

5. In a land marker, a supporting shaft, a series of teeth permanently mounted on said shaft, a series of longer teeth adjustably mounted on said shaft, a supporting girt secured to the permanent teeth, springs for actuating the adjustable teeth to hold them to the surface of the ground being marked, and the ends of all teeth curved backward.

Signed at Cedar Springs Michigan April 20th 1914.

WILLIAM H. SIMMONS.
FLOYD G. SIMMONS.

In presence of—
MILES MULFORD,
JOHN F. PETERSON.